United States Patent
Koumura (10) Patent No.: US 12,344,064 B2
(45) Date of Patent: Jul. 1, 2025

(54) DAMPING COEFFICIENT CONTROL DEVICE FOR A SHOCK ABSORBER

(71) Applicant: TOYOTA JIDOSHA KABUSHIKI KAISHA, Toyota (JP)

(72) Inventor: Shingo Koumura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/664,858

(22) Filed: May 15, 2024

(65) Prior Publication Data
US 2024/0383300 A1 Nov. 21, 2024

(30) Foreign Application Priority Data
May 17, 2023 (JP) ................................ 2023-081714

(51) Int. Cl.
*B60G 17/06* (2006.01)
*B60G 17/016* (2006.01)

(52) U.S. Cl.
CPC ............ *B60G 17/06* (2013.01); *B60G 17/016* (2013.01); *B60G 2400/302* (2013.01); *B60G 2500/10* (2013.01)

(58) Field of Classification Search
CPC .............................. B60G 17/06; B60G 17/016; B60G 2400/302; B60G 2500/10; B60G 17/015; B60G 17/018
See application file for complete search history.

(56) References Cited

U.S. PATENT DOCUMENTS

| | | | | |
|---|---|---|---|---|
| 2019/0351726 A1* | 11/2019 | Okimura | ............ | B60G 17/0152 |
| 2021/0188252 A1* | 6/2021 | Lu | ............ | B60W 40/12 |
| 2021/0402841 A1* | 12/2021 | Furuta | ............ | B60G 17/0165 |

FOREIGN PATENT DOCUMENTS

| | | | | | |
|---|---|---|---|---|---|
| CN | 101932462 A | * | 12/2010 | ............ | B60G 17/06 |
| CN | 111038206 A | * | 4/2020 | ............ | B60G 17/015 |
| CN | 110329030 B | * | 3/2021 | ............ | B60G 17/018 |
| CN | 118082441 A | * | 5/2024 | | |
| CN | 118238567 A | * | 6/2024 | ............ | B60G 17/015 |
| CN | 118617927 A | * | 9/2024 | | |
| CN | 118810324 A | * | 10/2024 | | |
| JP | 2009-040349 A | | 2/2009 | | |
| RU | 2448000 C2 | * | 4/2012 | ............ | B60G 13/16 |
| WO | WO-2013105229 A1 | * | 7/2013 | ............ | B60G 17/00 |
| WO | WO-2014039981 A1 | * | 3/2014 | ............ | B60G 15/067 |

* cited by examiner

*Primary Examiner* — Drew J Brown
(74) *Attorney, Agent, or Firm* — Sughrue Mion, PLLC (57) ABSTRACT

A damping coefficient control device for a shock absorber applied to a vehicle equipped with a wheel that is rotatably supported about a rotational axis and has a tire, and a drive system that drives the wheel via a transmission by an engine, in which the damping coefficient control device includes a variable damping coefficient shock absorber arranged between a wheel carrier and a vehicle body and an electronic control unit that controls the shock absorber, and the electronic control unit acquires information on an index indicating an equivalent moment of inertia of the drive system, and controls the damping coefficient of the shock absorber such that the smaller the equivalent moment of inertia indicated by the index, the larger the damping coefficient of the shock absorber.

5 Claims, 8 Drawing Sheets

DAMPING COEFFICIENT CONTROL DEVICE FOR A SHOCK ABSORBER

CROSS-REFERENCE TO RELATED APPLICATION

This application claims priority to Japanese Patent Application No. JP2023-081714 filed on May 17, 2023, the content of which is hereby incorporated by reference in its entirety into this application.

BACKGROUND

1. Technical Field

The present disclosure relates to a damping coefficient control device for a shock absorber for a vehicle such as an automobile.

2. Description of the Related Art

A suspension is known that improves ride comfort of a vehicle by reducing a longitudinal force acting on a wheel due to vertical input from a road surface. For example, in Japanese Patent Application Laid-open No. 2009-040349, a suspension is described in which a suspension arm is arranged so that a rotational axis of a wheel draws a locus inclined backward as the wheel moves up and down when viewed in the lateral direction of a vehicle, and a shock absorber is arranged so that it is inclined forward.

According to this type of suspension, a longitudinal force acting on the wheel due to vertical input from the road surface can be at least partially offset by a longitudinal force generated by the backward inclination of the locus and a longitudinal force generated by a damping force of the shock absorber, which makes it possible to reduce a longitudinal force of the wheel.

In a vehicle that has a drive system in which a wheel is rotationally driven by a drive source via a transmission, when a torsional resonance frequency of the drive system approaches a vertical resonance frequency of a suspension, longitudinal vibration caused by the longitudinal force of the wheel becomes significant. As will be explained in detail later, the torsional resonance frequency of the drive system is determined by a moment of inertia and torsional rigidity of the drive system, and the moment of inertia of the drive system varies as a gear ratio of the transmission changes. Therefore, the longitudinal force acting on the wheel due to vertical input from the road surface changes with changes in the moment of inertia of the drive system, and therefore changes with changes in the gear ratio of the transmission.

The suspension described in the above publication cannot cope with fluctuation in the longitudinal force acting on the wheel due to fluctuation in the moment of inertia of the drive system. Therefore, it is not possible to effectively reduce the longitudinal force acting on the wheel due to vertical input from the road surface irrespective of fluctuation in the moment of inertia of the drive system due to change in the gear ratio of the transmission.

SUMMARY

The present disclosure provides an improved damping coefficient control device for a shock absorber that is capable of significantly reducing a longitudinal force acting on a wheel due to vertical input from a road surface, even if an equivalent moment of inertia of a drive system changes due to changes in a gear ratio of a transmission.

According to the present disclosure, a damping coefficient control device for a shock absorber is provided which is applied to a vehicle equipped with a wheel that is rotatably supported about a rotational axis by a wheel carrier and has a tire, a drive system that rotationally drives the wheel by a drive source via a transmission and a drive shaft, and a suspension arm that is arranged between the wheel carrier and a vehicle body.

The damping coefficient control device includes a variable damping coefficient shock absorber arranged between the wheel carrier and the vehicle body and an electronic control unit that controls the shock absorber, and the electronic control unit is configured to acquire information on an index indicating an equivalent moment of inertia of the drive system, and control a damping coefficient of the shock absorber such that the smaller the equivalent moment of inertia indicated by the index, the larger the damping coefficient of the shock absorber.

As will be explained in detail later, in order to reduce a longitudinal force acting on a wheel due to vertical input from a road surface to the wheel, it may be considered to match a vertical resonant frequency of an unsprung with an anti-resonant frequency of a drive shaft. The anti-resonance frequency of the drive shaft changes according to an equivalent moment of inertia of the drive system, and the vertical resonance frequency of the unsprung changes according to a damping coefficient of the shock absorber. The damping coefficient of the shock absorber for matching the vertical resonance frequency of the unsprung and the anti-resonance frequency of the drive shaft increases as the equivalent moment of inertia of the drive system decreases.

According to the above configuration, the damping coefficient of the shock absorber is controlled such that the smaller the equivalent moment of inertia indicated by the index, the larger the damping coefficient of the shock absorber becomes. Therefore, the vertical resonant frequency of the unsprung can be changed in accordance with the change in the anti-resonance frequency of the drive shaft due to the change in the equivalent moment of inertia of the drive system. Accordingly, as compared to where even if the equivalent moment of inertia of the drive system changes, the damping coefficient of the shock absorber is not changed according to the change in the equivalent moment of inertia, the longitudinal force acting on the wheel can be reduced significantly.

In one aspect of the present disclosure, the wheel carrier and the wheel constitute an unsprung, and the electronic control unit stores a relationship between a target damping coefficient of the shock absorber and an index which is necessary for matching a vertical resonance frequency of the unsprung with an anti-resonance frequency of the drive shaft, and is configured to determine a target damping coefficient from the relationship based on the index, and control the damping coefficient so that the damping coefficient becomes the target damping coefficient.

In another aspect of the present disclosure, the relationship between the target damping coefficient of the shock absorber and the index is set based on the relationship between the target damping coefficient of the shock absorber and the equivalent moment of inertia which is necessary to match the vertical resonance frequency of the unsprung with an anti-resonance frequency of the drive shaft.

Further, in another aspect of the present disclosure, the index is a gear ratio of the transmission, and the relationship is a relationship between the target damping coefficient and the gear ratio of the transmission which is set such that the smaller the gear ratio of the transmission, the larger the target damping coefficient.

Further, in another aspect of the present disclosure, the transmission is a multi-stage transmission, the index is a gear stage of the transmission, and the relationship is a relationship between a target damping coefficient and a gear stage of the transmission which is set such that the higher the gear stage of the transmission, the larger the target damping coefficient.

DETAILED DESCRIPTION

The present disclosure will now be described in detail with respect to an embodiment with reference to the accompanying drawings.

Embodiment

Figure 1:
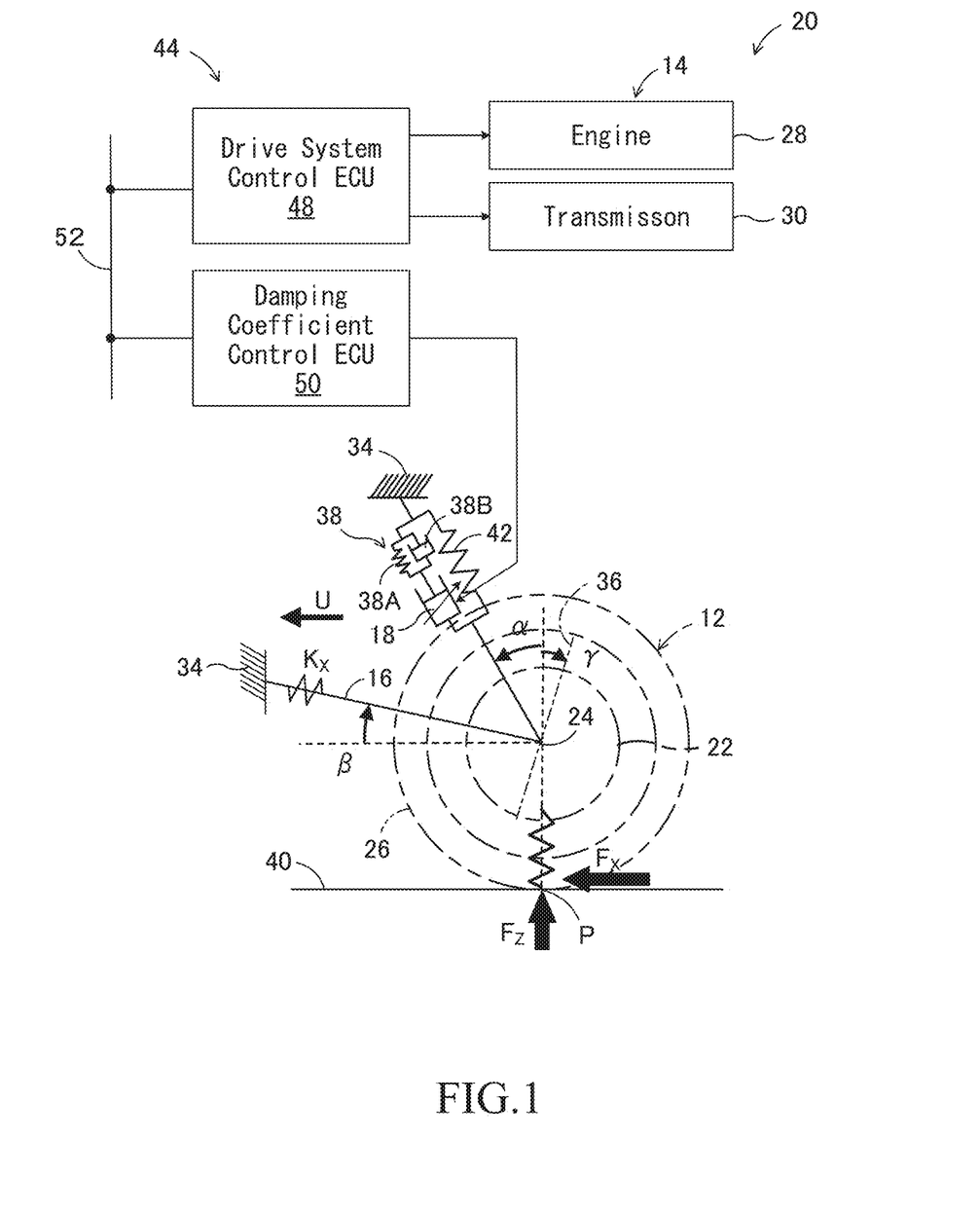
FIG. 1 is a schematic configuration diagram showing an embodiment of a damping coefficient control device for a shock absorber according to the present disclosure.
Figure 2:
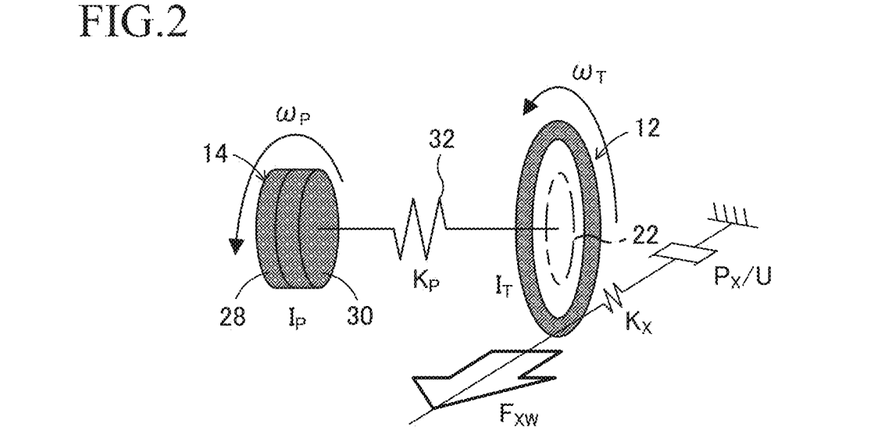
FIG. 2 is an explanatory diagram showing a wheel driven by a drive system.

As shown in FIGS. 1 and 2, the damping coefficient control device 10 according to the embodiment of the present disclosure is applied to a vehicle 20 that includes a wheel 12, a drive system 14 and a suspension arm 16, and includes a variable damping coefficient shock absorber 18. The vehicle 20 may be a vehicle capable of automatic driving. The wheel 12 is rotatably supported about a rotational axis 24 by a wheel carrier 22 and has an elastically deformable tire 26, as is well known. The drive system 14 is configured to rotationally drive the wheel 12 via a transmission 30 and a drive shaft 32 using an engine 28 as a drive source. The suspension arm 16 and the shock absorber 18 are arranged between the wheel carrier 22 and a vehicle body 34.

Although only one suspension arm is shown in FIG. 1, the suspension arm may include a plurality of arms, links, etc. and the suspension arm 16 is shown as a suspension arm equivalent to a plurality of arms, links, etc. when viewed from the side of the vehicle 20. The drive source may be any drive source known in the art other than an engine. Further, in the embodiment, the transmission 30 is a continuously variable transmission, but it may be a multi-stage transmission such as a gear type transmission.

The suspension arm 16 is connected to the wheel carrier 22 and the vehicle body 34 so that the rotational axis 24 draws a locus 36 inclined backward at an angle γ with respect to the vertical direction as the wheel 12 moves up and down when viewed in the lateral direction of the vehicle 20. The end of the suspension arm 16 on the vehicle body 34 side is located at a position higher than the end on the wheel carrier 22 side. Considering a situation where the wheel 12 is at a neutral position of vertical displacement, an inclination angle of the suspension arm 16, that is, an angle that a straight line connecting both the ends makes with the horizontal direction is β. Note that the locus 36 does not have to be a straight line, and the angle γ of the backward inclination of the locus 36 may be considered to be the same as the inclination angle β within a range of vertical displacement of the wheel 12 as the vehicle 20 travels.

The shock absorber 18 is disposed between the wheel carrier 22 and the vehicle body 34 in a forward inclined state, and a forward inclination angle, that is, an angle that a main axis (not shown) of the shock absorber makes with the vertical direction is α. The shock absorber 18 has an upper end connected to the vehicle body 34 via an upper support 38 and a lower end connected to the wheel carrier 22. The upper support 38 functions as a spring 38A and a damper 38B. As is well known, the shock absorber 18 generates a damping force corresponding to a product of a relative speed of the wheel 12 and the vehicle body 34 and a damping coefficient C, and changes the damping force by changing the damping coefficient C.

The backward inclination angle γ of the locus 36 and the forward inclination angle α of the shock absorber are set such that a longitudinal force $F_{x1}$ that acts on the wheel 12 at a ground contact point P due to a vertical input from a road surface 40 is at least partially offset by a longitudinal force $F_{x2}$ generated by the backward inclination of the locus 36 and a longitudinal force $F_{x3}$ generated by a damping force of the shock absorber.

Figure 3A:
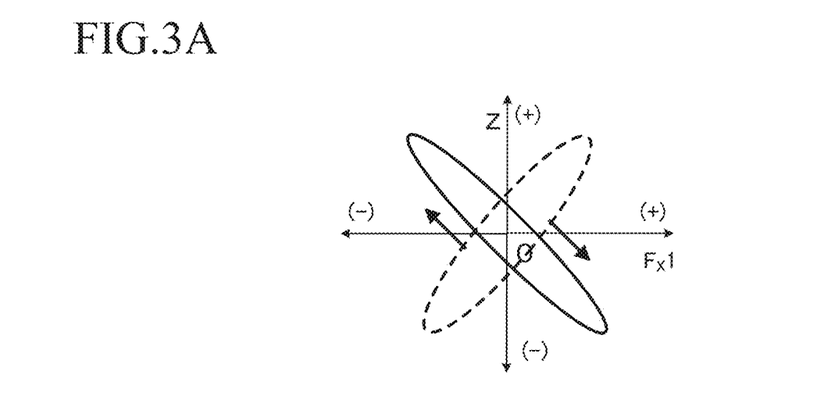
FIG. 3A is a diagram showing an example of a relationship between a vertical displacement Z of a wheel and a longitudinal force $F_{x1}$.
Figure 3B:
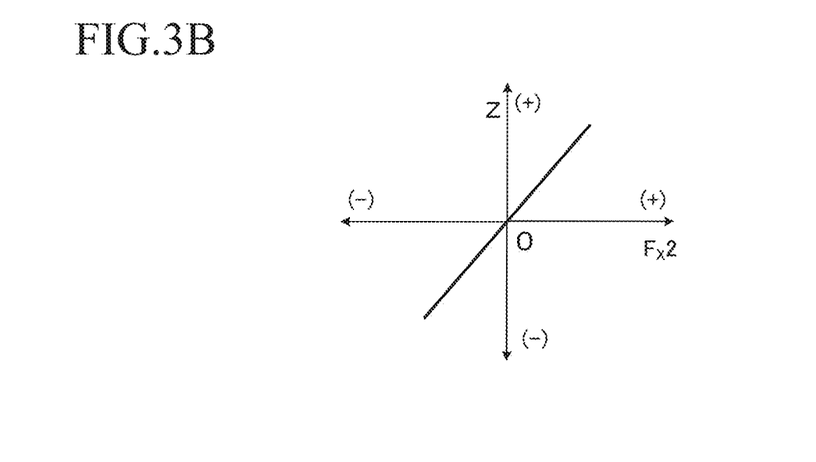
FIG. 3B is a diagram showing an example of a relationship between a vertical displacement Z of the wheel and a longitudinal force $F_{x2}$.
Figure 3C:
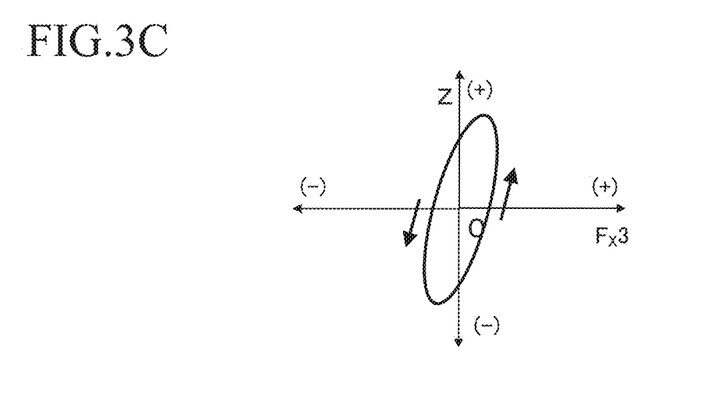
FIG. 3C is a diagram showing an example of a relationship between a differential value of the vertical displacement Z of the wheel and a longitudinal force $F_{x3}$.

For example, FIG. 3A shows an example of a relationship between the vertical displacement Z of the wheel 12 as an unsprung and the longitudinal force $F_{x1}$. The longitudinal force $F_{x1}$ assumes a negative value when the vertical displacement Z is positive (upward displacement). FIG. 3B shows an example of a relationship between the vertical displacement Z of the wheel 12 and the longitudinal force $F_{x2}$. The longitudinal force $F_{x2}$ assumes a positive value when the vertical displacement Z is positive, and is proportional to the vertical displacement Z. FIG. 3C shows an example of a relationship between a differential value of the vertical displacement Z of the wheel 12 and the longitudinal force $F_{X3}$. The longitudinal force $F_{X3}$ assumes a positive value when a differential value of the vertical displacement Z, that is, an upward displacement speed of the wheel 12 is positive, and is substantially proportional to the displacement speed.

A sum of the longitudinal forces $F_{X2}$ and $F_{X3}$ is the value shown by the broken line in FIG. 3A. Therefore, the longitudinal force $F_{X1}$ can be at least partially offset by the sum of the longitudinal forces $F_{X2}$ and $F_{X3}$. It is to be noted that in FIGS. 3A and 3C, arrows indicate directions of changes in the longitudinal forces $F_{X1}$ and $F_{X2}$ due to the vertical displacement of the wheel 12.

A suspension spring 42 is also arranged between the wheel carrier 22 and the vehicle body 34. In the embodiment, the suspension spring 42 is a coil spring, but may be any spring known in the art, such as an air spring.

The damping coefficient control device 10 includes an electronic control unit 44 that controls the shock absorber 18. The electronic control unit 44 includes a drive system control ECU 48, and a damping coefficient control ECU 50. Each ECU is an electronic control unit that includes a microcomputer as a main part.

The microcomputer of each ECU includes a CPU, a ROM, a RAM, a readable/writable nonvolatile memory (N/M), an interface (I/F), and the like. The CPU implements various functions by executing instructions (programs, routines) stored in the ROM. Further, these ECUs and sensors such as the vehicle speed sensor (not shown) are communicably connected to each other via a CAN (Controller Area Network) 52.

The drive system control ECU 48 controls an output torque T of the drive system 14 and, therefore, a drive torque applied to a wheel 12 by controlling an output of the engine 28 and a transmission ratio (gear ratio) Rt of the transmission 30. The drive system control ECU 48 outputs a signal indicating the gear ratio Rt of the transmission 30 to the damping coefficient control ECU 50 via the CAN 52. The gear ratio Rt is an index indicating an equivalent moment of inertia $I_P$ of the drive system 14, and the equivalent moment of inertia $I_P$ is a product of a sum of equivalent moments of inertia of each individual component of the transmission 30 and a square of the gear ratio Rt. Therefore, it is proportional to the square of the gear ratio Rt.

As described above, reducing the longitudinal force $F_{X1}$ by offsetting the longitudinal force $F_{X1}$ by a sum of the longitudinal forces $F_{X2}$ and $F_{X3}$ is the principle of longitudinal force reduction described in the Laid-open publication mentioned above. The embodiment of the present disclosure reduces the longitudinal force $F_{X1}$ itself by controlling the damping coefficient C of the shock absorber 18 to match a vertical resonance frequency of an unsprung with an anti-resonance frequency of the drive shaft. In the embodiment as well, it is preferable that the longitudinal force $F_{X1}$ is at least partially offset by the sum of the longitudinal forces $F_{X2}$ and $F_{X3}$, as described above.

As will be described in detail later, the wheel carrier 22 and the wheel 12 constitute an unsprung 54 (see FIGS. 7A and 7B), and the damping coefficient control ECU 50 controls the shock absorber so that the vertical resonance frequency of the unsprung matches with the anti-resonance frequency of the drive shaft 32. The anti-resonance frequency of the drive shaft 32 changes according to a change in the equivalent moment of inertia $I_P$ of the drive system 14. Therefore, the damping coefficient control ECU 50 acquires information on a gear ratio Rt as an index indicating the equivalent moment of inertia $I_P$ of the drive system 14, and controls the damping coefficient C of the shock absorber 18 so that the smaller the equivalent moment of inertia indicated by the index, the larger the damping coefficient becomes.

Principle of Damping Coefficient Control of Present Disclosure Adopted in Embodiment In order to facilitate understanding of the present disclosure and the embodiment, the principle of the damping coefficient control in the present disclosure will be explained.

It is assumed that the longitudinal force $F_{X1}$ acting on the wheel 12 at the grounding point P due to the vertical input from the road surface 40 is a sum of a longitudinal force $F_{XT}$ (FIG. 4) acting on the wheel 12 due to a slope of the road surface 40 and a longitudinal force $F_{XS}$ (FIG. 5) that acts on the wheel 12 due to slip of the wheel.

Figure 4:
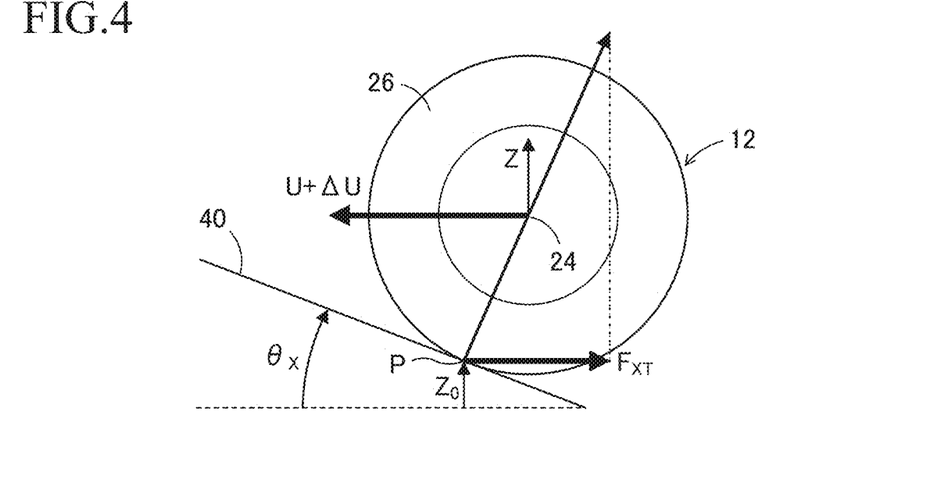
FIG. 4 is a diagram showing a longitudinal force $F_{XT}$ that acts on a wheel due to a slope of a road surface.

As shown in FIG. 4, an inclination angle of the road surface 40 is represented by $\theta_X$, and a ground load of the wheel 12 is represented by W (not shown). A steady component of a longitudinal speed of the wheel 12 is represented by U, a fluctuating component of the longitudinal speed of the wheel 12 is represented by $\Delta U$, and a vertical displacement of the road surface 40 is represented by $Z_0$. The longitudinal force $F_{XT}$ is expressed by the following equation (1).

$$F_{XT} = -W\tan\theta_X \qquad (1)$$
$$= -W\frac{\dot{Z}_0}{U+\Delta U}$$

Figure 5:
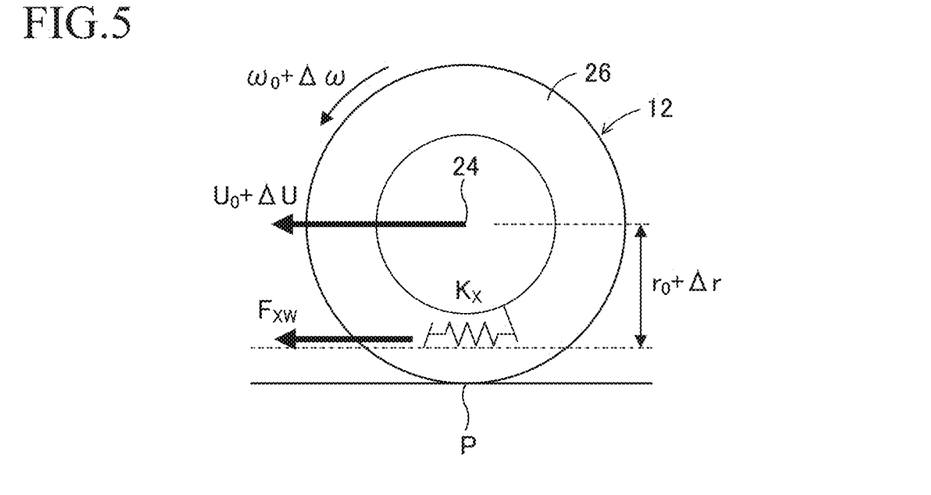
FIG. 5 is a diagram for explaining a longitudinal force $F_{XS}$ acting on a wheel due to wheel slip.

As shown in FIGS. 2 and 5, a driving stiffness is represented by Px, and a slip rate of the wheel 12 is represented by Sx (not shown). A radius (steady component) of the tire 26 is represented by $r_0$, and a fluctuating component of a rolling radius of the tire 26 is represented by $\eta\Delta r$. Note that $\eta$ is a ratio of an amount of variation in the rolling radius to an amount of vertical deformation of the tire. A steady component and a fluctuating component of a rotational angular velocity of the wheel 12 are represented by $\omega 0$ and $\Delta\omega$, respectively. A longitudinal force acting on the wheel at the grounding point P due to a drive torque applied to the wheel 12 is represented by $F_{XW}$, a longitudinal spring constant of the tire 26 is represented by $K_X$, and a Laplace operator is represented by s. The longitudinal force $F_{XS}$ is expressed by the following equation (2).

$$F_{XS} = P_X S_X \qquad (2)$$
$$= P_X\left\{\frac{(r_0+\mu\Delta r)(\omega_0+\Delta\omega)-F_{Xw}s/K_X}{U+\Delta U}-1\right\}$$

Representing respectively a rotational angular velocities of the drive system 14 and the wheel 12 by $\omega_P$ and $\omega_T$ ($=\omega_0+\Delta\omega$), and representing a torsional rigidity of the drive shaft 32 by $K_P$, the following equation (3) holds true as the equation of motion in the rotational direction of the drive system 14.

$$I_P \omega_P s = -K_P\left(\frac{\omega_P}{s} - \frac{\omega_T}{s}\right) \tag{3}$$

Representing an equivalent moment of inertia of the wheel 12 by $I_T$, the following equation (4) holds true as a motion equation in the rotational direction of the wheel.

$$I_T \omega_T s = -F_{Xw} r_0 + K_P\left(\frac{\omega_P}{s} - \frac{\omega_T}{s}\right) \tag{4}$$

By determining the longitudinal force $F_{XW}$ from the above equations (3) and (4) and substituting it into the above equation (2), the longitudinal force $F_{X1}$ acting on the wheel 12 is expressed by the following equation (5).

$$F_{X1} = F_{XT} + F_{XS} \tag{5}$$

$$= h'(s)\left\{-\frac{W}{U}\dot{Z}_0 + \frac{P_X \omega_0 \eta}{U}(Z - Z_0) - \frac{P_X}{U}\dot{X}\right\}$$

In equation (5), h'(s) is a term of dynamic characteristics, and the terms in curly braces are terms of steady characteristics. Influence of the first and third terms of the steady characteristic terms on the longitudinal force $F_{X1}$ is smaller than that of the second term. Therefore, if the first and third terms are omitted, h'(s) is expressed by the following equation (6).

$$h'(s) \cong \frac{UK_X s}{P_X} \frac{\left(s^2 \frac{I_T + I_P}{I_T I_P} K_p\right)}{\left(s^2 + \frac{K_P}{I_P}\right)\left(s^2 + \frac{UK_X}{P_X}s + \frac{K_X r_0^2}{I_T}\right)} \tag{6}$$

$$= \frac{UK_X}{P_X} \frac{s^2 + \omega_D^2}{(s^2 + \omega_E^2)(s^2 + 2\zeta_W \omega_W s + \omega_W^2)}$$

Notably, in equation (6), $\omega_E$ is a resonance frequency of the rotation of the drive system 14 expressed by the following equation (7), and $\omega_W$ is a resonance frequency of the rotation of the wheel 12 expressed by the following equation (8). $\omega_D$ is a torsional resonance frequency, ie, anti-resonance frequency, of the drive shaft 32 expressed by the following equation (9), and $\zeta_W$ is a damping ratio in the rotational direction of the wheel 12 expressed by the following equation (10).

$$\omega_E = \sqrt{\frac{K_P}{I_P}} \tag{7}$$

$$\omega_W = \sqrt{\frac{K_X r_0^2}{I_T}} \tag{8}$$

$$\omega_D = \sqrt{\frac{K_P(I_P + I_T)}{I_P I_T}} \tag{9}$$

$$\zeta_W = \frac{U}{3P_X r_0}\sqrt{I_T K_X} \tag{10}$$

Figure 6:
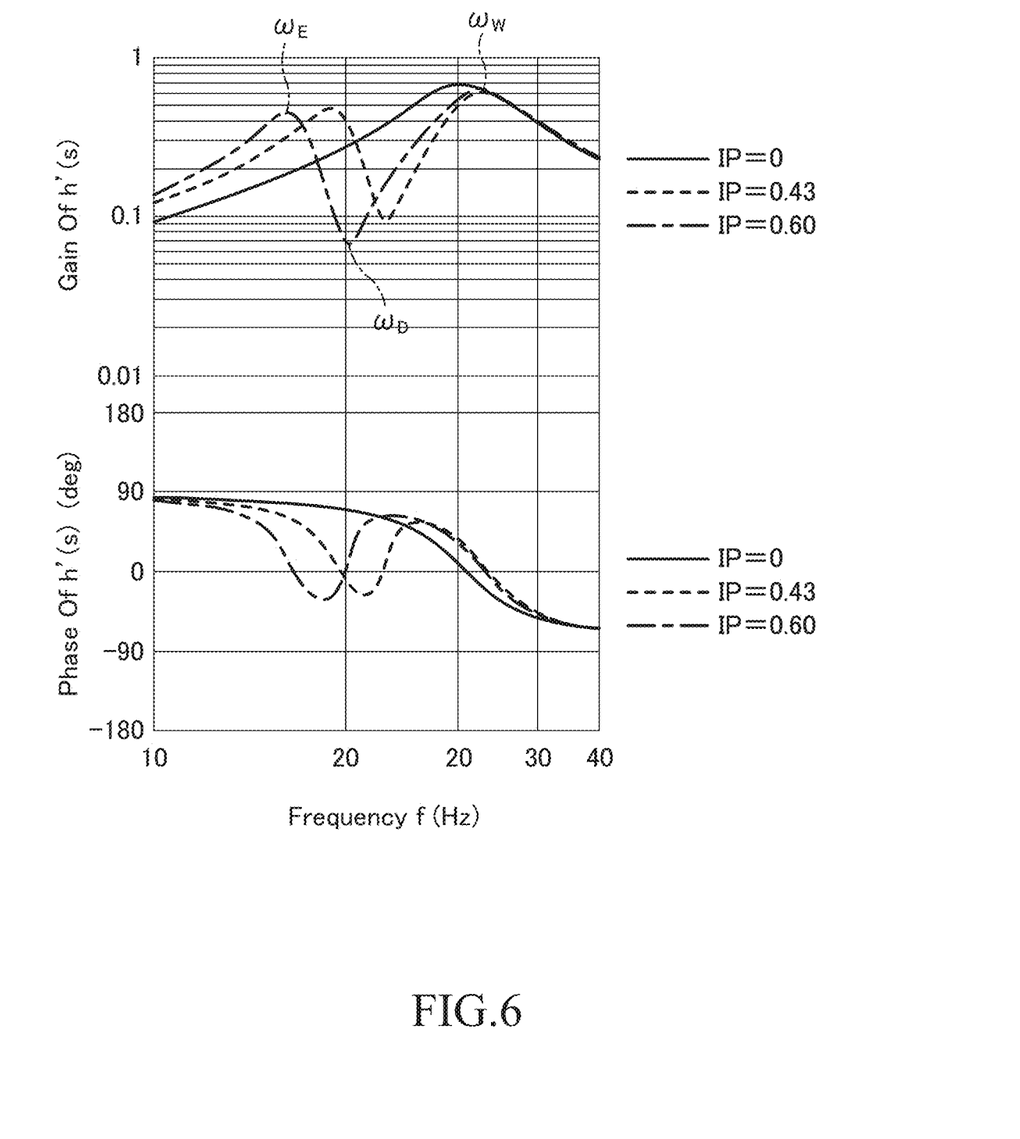
FIG. 6 is a diagram showing a relationship between gain of h'(s) and frequency f (upper part) and a relationship between phase of h'(s) and frequency f (lower part).

The upper part of FIG. 6 shows an example of a relationship between gain of h'(s) and frequency f, and the lower part of FIG. 6 shows an example of a relationship between phase of h'(s) and frequency f. In FIG. 6, a solid line, a broken line, and a dashed-dotted line indicate values when the equivalent moment of inertia $I_P$ of the drive system 14 is 0, 0.43, and 0.60, respectively.

From FIG. 6, it can be seen that as the equivalent moment of inertia $I_P$ increases, the gain of h'(s) increases and the phase of h'(s) lags in the frequency band of 10 to 20 Hz. Furthermore, it can be seen that the gain of h'(s) becomes minimum at the anti-resonant frequency $\omega_D$.

Figure 7A:
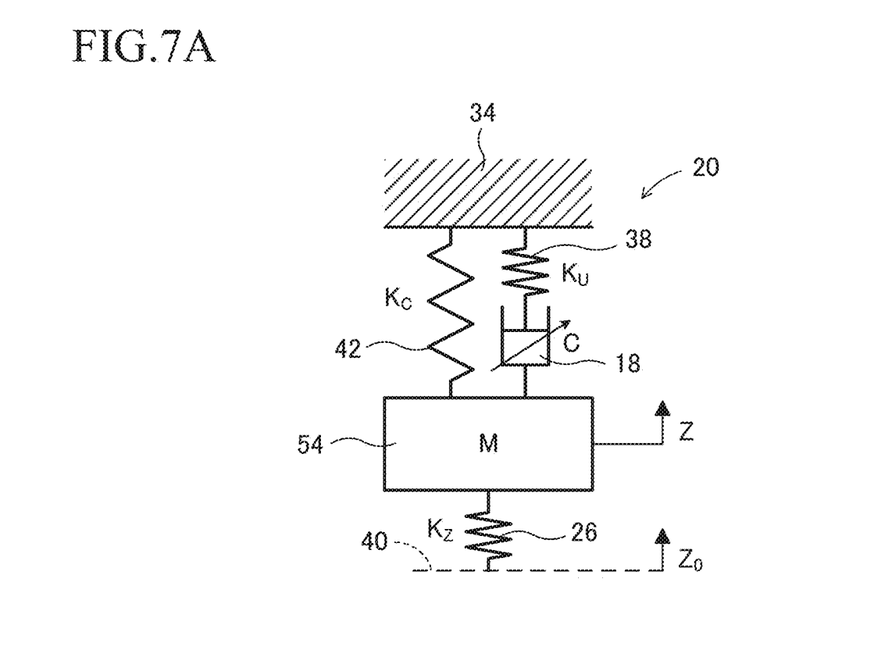
FIG. 7A is a diagram showing a single-wheel model of a vehicle in which a damper of an upper support is omitted

FIG. 7A shows a single-wheel model of the vehicle 20 with the damper 38B of the upper support 38 (see FIG. 1) omitted. In FIG. 7A, $Z_0$ and Z indicate a vertical displacement of the road surface 40 and a vertical displacement of the unsprung 54, respectively. $K_U$ is a spring constant of the upper support 38 (spring 38A), $K_C$ is a spring constant of the suspension spring 42, and $K_Z$ is a spring constant in the vertical direction of the tire 26. Furthermore, C is a variable damping coefficient of the shock absorber 18 and M is a mass of the unsprung 54.

Figure 7B:
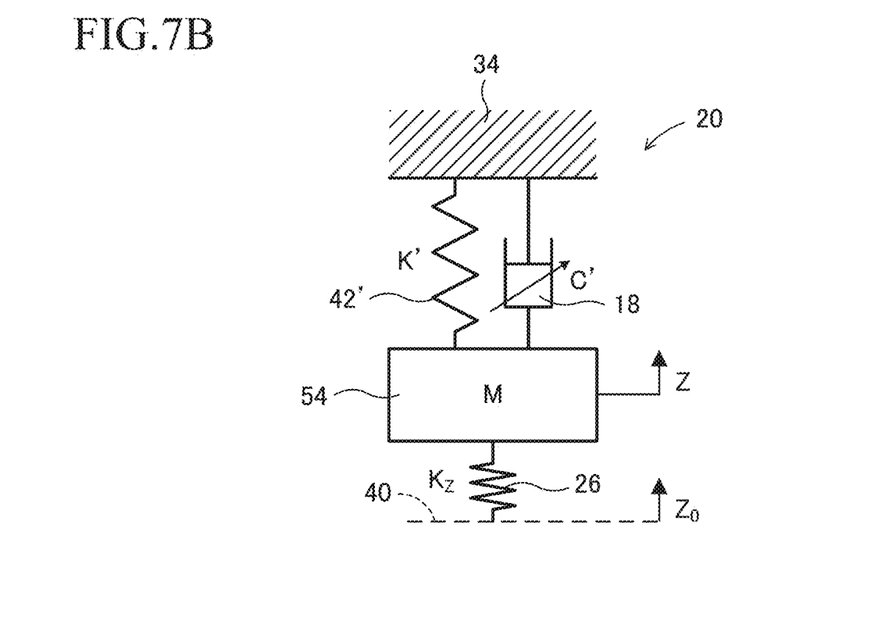
FIG. 7B is a diagram showing a single-wheel model of the vehicle in which a suspension spring and a spring of the upper support are integrated into the suspension spring.

FIG. 7B shows a single-wheel model of the vehicle 20 in which the suspension spring 42 and the spring 38A of the upper support 38 are integrated into a suspension spring 42'. In FIG. 7B, K' is an equivalent spring constant of the suspension spring 42', and C' is an equivalent damping coefficient of the shock absorber 18. The equivalent spring constant K' and the equivalent damping coefficient C' are expressed by the following equations (11) and (12), respectively.

$$K' = \frac{(C \times 2\pi f C)^2}{K_U^2 + (C \times 2\pi f C)^2} K_U + K_C \tag{11}$$

$$C' = \frac{K_U^2}{K_U^2 + (C \times 2\pi f C)^2} C \tag{12}$$

From FIG. 7B and the above equation (11), the vertical resonance frequency of the unsprung 54 is a frequency f that satisfies the following equation (13).

$$M \times (2\pi f)^2 = K' + K_Z \tag{13}$$

$$= \frac{(C \times 2\pi f C)^2}{K_U^2 + (C \times 2\pi f C)^2} K_U + K_C + K_Z$$

Figure 8:
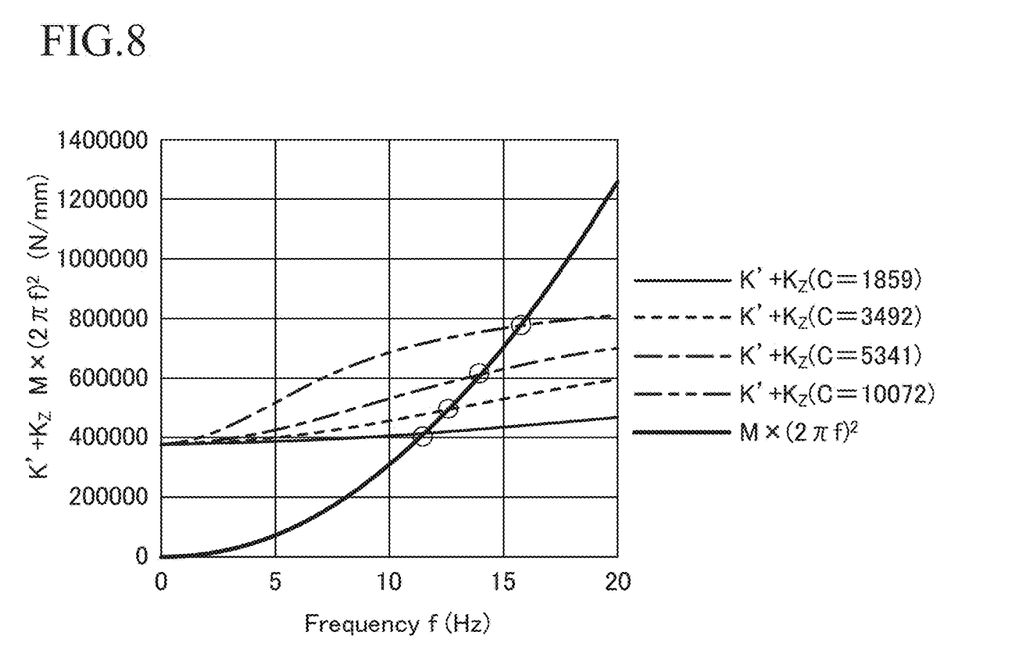
FIG. 8 is a diagram showing an example of a relationship between $M \times (2\pi f)^2$ and a frequency f (thick line) and a relationship between a sum of spring constants $K'+K_Z$ (thin lines) and the frequency f.

FIG. 8 shows an example of a relationship between $M \times (2\pi f)^2$ and the frequency f (thick solid line) and examples of relationships between a sum of spring constants $K' + K_Z$ and the frequency f (a plurality of thin lines). In FIG. 8, a solid thin line, a broken thin line, a dashed-dotted thin line, and a dashed-double-dotted thin line indicate values when the damping coefficient C (Nsec/m) is 1859, 3492, 5341, and 10072, respectively.

In FIG. 8, the marks ○ indicate intersections between the thick solid line and the thin lines, and therefore the points where the above equation (13) is satisfied, and the frequency of each intersection indicates the vertical resonance frequency of the unsprung 54. From FIG. 8, it can be seen that the vertical resonance frequency of the unsprung 54 changes depending on the damping coefficient C, and in particular, the higher the damping coefficient C is, the higher the vertical resonance frequency becomes.

It is assumed that a torsional rigidity $K_P$ of the drive shaft 32 is set to such a rigidity that the anti-resonance frequency $\omega_D$ expressed by the above equation (9) matches with a vertical resonance frequency of the unsprung 54. Focusing on a case where the damping coefficient C is 5341, the vertical resonance frequency of the unsprung 54 is 14 Hz.

Figure 9:
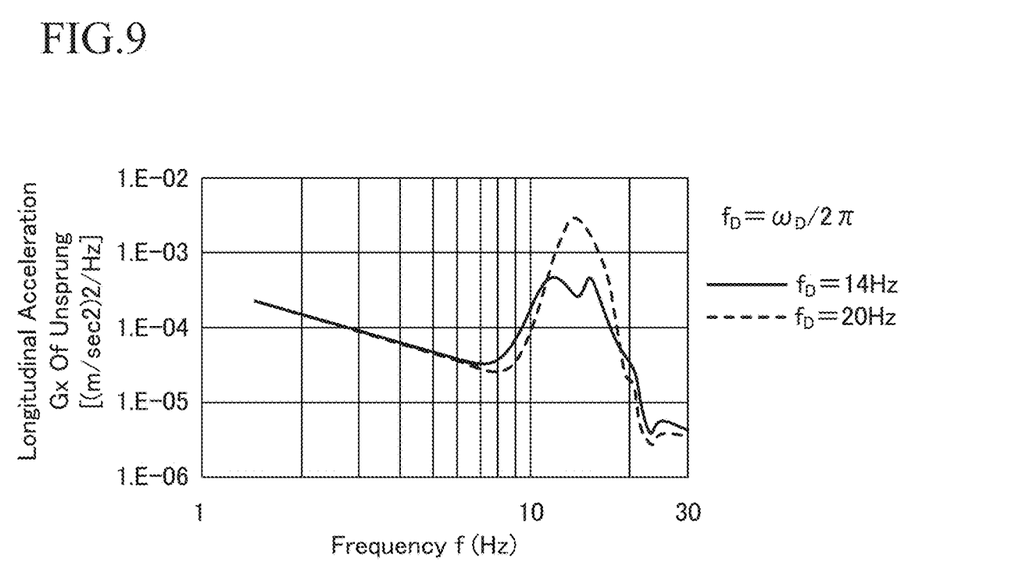
FIG. 9 is a diagram showing an example of a relationship between a longitudinal acceleration $G_X$ of an unsprung and the frequency f.

FIG. 9 shows an example of a relationship between a longitudinal acceleration Gx of the unsprung 54 and the frequency f. In FIG. 9, the solid line indicates values when the anti-resonant frequency $f_D = \omega_D/2\pi$ is 14 Hz, and the broken line indicates values when the anti-resonant frequency $f_D$ is 20 Hz. From FIG. 9, it can be seen that when the anti-resonance frequency $f_D$ is a frequency that satisfies the above equation (13), the longitudinal acceleration Gx of the unsprung 54 can be reduced as compared to when the anti-resonance frequency $f_D$ is a frequency that does not satisfy the equation (13), which makes it possible to reduce the longitudinal force acting on the unsprung. In other words, it can be seen that when the vertical resonance frequency of the unsprung 54 and the anti-resonance frequency $f_D$ match, the longitudinal force acting on the unsprung can be reduced as compared to where they do not match with each other.

The anti-resonance frequency $\omega_D$ expressed by the above equation (9) is a function of the equivalent moment of inertia $I_P$ of the drive system 14, such that, as shown in Table 1 below, for example, the anti-resonant frequency $\omega_D$ assumes different values depending on the equivalent moment of inertia $I_P$. It is to be noted that the values in Table 1 are values when the equivalent moment of inertia $I_P$ of the wheel 12 is 3 kgm² and the torsional rigidity $K_P$ of the drive shaft 32 is 8000 Nm/rad.

TABLE 1

| $I_P$ (kgm²) | $\omega_D/2\pi$ (Hz) |
|---|---|
| ☐☐☐☐ | ☐☐☐☐ |
| ☐☐☐☐ | ☐☐☐☐ |
| ☐☐☐☐ | ☐☐☐☐ |
| ☐☐☐☐ | ☐☐☐☐ |

$I_T$☐ 3 kgm²
$K_P$☐ 8000 Nm/rad

When the frequency f is the anti-resonance frequency $f_D$, the following equation (14) is established from the above equation (13). From equation (14), the damping coefficient C of the shock absorber 18 is expressed by the equation (15) below.

$$M\omega_D^2 = \frac{(C\omega_D)^2}{K_U^2 + (C\omega_D)^2} K_U + K_C + K_Z \quad (14)$$

$$C = \frac{1}{\omega_D} \sqrt{\frac{K_U^2(M\omega_D^2 - K_C - K_Z)}{K_U - (M\omega_D^2 - K_C - K_Z)}} \quad (15)$$

Figure 10:
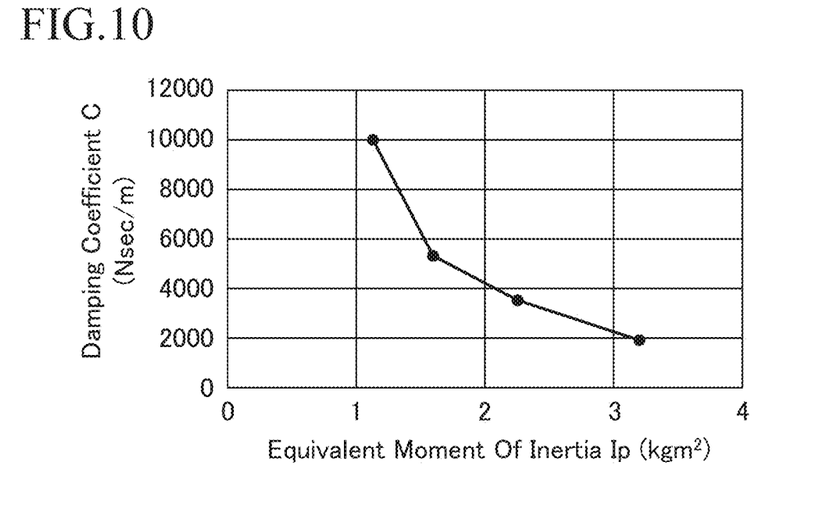
FIG. 10 is a diagram showing an example of a relationship between an equivalent moment of inertia $I_P$ of the drive system that determines a resonance frequency $\omega_D$ and a damping coefficient C of the shock absorber.

FIG. 10 shows an example of a relationship between the equivalent moment of inertia $I_P$ of the drive system 14 which determines the anti-resonance frequency $\omega_D$ and the damping coefficient C of the shock absorber 18. It can be seen from FIG. 10 that the damping coefficient C of the shock absorber 18 that satisfies the above equation (13) increases as the equivalent moment of inertia $I_P$ decreases.

Figure 11A:
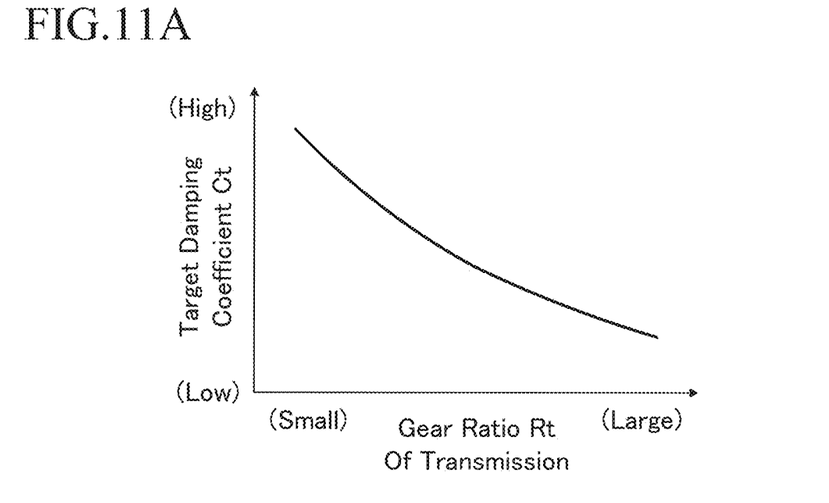
FIG. 11A is a diagram showing an example of a relationship between a gear ratio Rt and a target damping coefficient Ct of the shock absorber

FIG. 11A shows an example of a relationship between the gear ratio Rt and a target damping coefficient Ct of the shock absorber 18, based on FIG. 10 and the relationship between the equivalent moment of inertia $I_P$ of the drive system 14 and the gear ratio Rt of the transmission 30. As shown in FIG. 11A, the target damping coefficient Ct increases as the gear ratio Rt decreases.

In the embodiment, the ROM of the damping coefficient control ECU 50 stores a damping coefficient control program and a map corresponding to FIG. 11A, that is, a map of the relationship between the gear ratio Rt and the target damping coefficient Ct. The program corresponds to the flowchart shown in FIG. 12, and damping coefficient control is executed according to this flowchart.

<Damping Coefficient Control Program in Embodiment>

Figure 12:
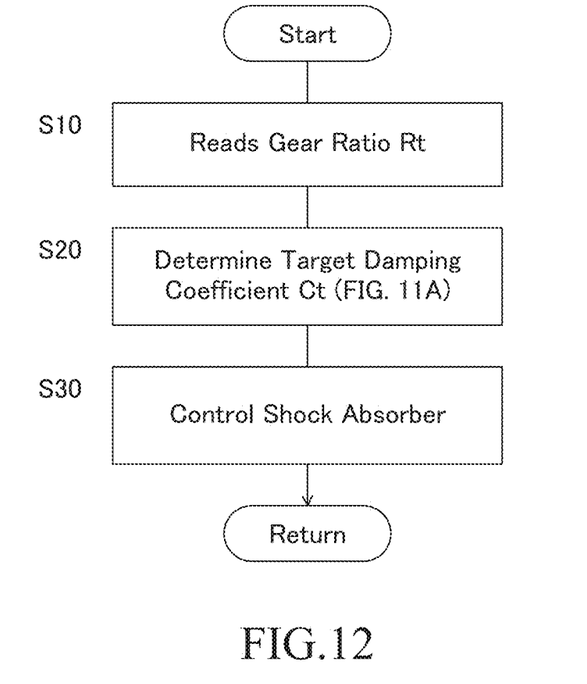
FIG. 12 is a flowchart corresponding to a damping coefficient control program in the embodiment.

Next, the damping coefficient control in the embodiment will be described with reference to the flowchart shown in FIG. 12. The damping coefficient control according to the flowchart shown in FIG. 12 is repeatedly executed at predetermined intervals by the CPU of the damping coefficient control ECU 50 while an ignition switch (not shown) is on.

First, in step S10, the CPU reads a signal indicating a gear ratio Rt of the transmission 30 from the drive system control ECU 48. As described above, the gear ratio Rt is the index indicating an equivalent moment of inertia $I_P$ of the drive system 14.

In step S20, the CPU determines a target damping coefficient Ct by referring to the map corresponding to FIG. 11A based on the gear ratio Rt.

In step S30, the CPU controls the shock absorber 18 so that the damping coefficient C of the shock absorber becomes the target damping coefficient Ct.

As can be seen from the above description, according to the embodiment, in order to reduce the longitudinal force acting on the wheel 12 due to the vertical input from the road surface 40 to the wheel, it is necessary to match the vertical resonant frequency of the unsprung with the anti-resonant frequency $\omega_D$ of the drive shaft 32. The anti-resonance frequency of the drive shaft changes according to the equivalent moment of inertia $I_P$ of the drive system 14, and the vertical resonance frequency of the unsprung changes according to the damping coefficient C of the shock absorber 18. The damping coefficient of the shock absorber for matching the vertical resonance frequency of the unsprung and the anti-resonance frequency of the drive shaft increases as the equivalent moment of inertia of the drive system decreases.

According to the embodiment, the damping coefficient of the shock absorber 18 is controlled such that the smaller the equivalent moment of inertia $I_P$ indicated by the index (gear ratio Rt or gear stage St), the larger the damping coefficient C of the shock absorber becomes. Therefore, the vertical resonant frequency of the unsprung can be changed in accordance with the change in the anti-resonance frequency of the drive shaft 32 due to the change in the equivalent moment of inertia of the drive system 24. Accordingly, as compared to where even if the equivalent moment of inertia of the drive system changes, the damping coefficient of the shock absorber is not changed according to the change in the equivalent moment of inertia, the longitudinal force acting on the wheel can be reduced significantly, which makes it possible to significantly reduce the longitudinal force input to the vehicle body.

In particular, according to the embodiment, the damping coefficient control ECU 50 of the electronic control unit 44 stores the relationship (FIG. 11A or FIG. 11B) between the target damping coefficient Ct of the shock absorber 18 and the index (gear ratio Rt or gear stage St), which is necessary for matching the vertical resonance frequency of the unsprung with the anti-resonance frequency $\omega_D$ of the drive shaft 30. Further, the damping coefficient control ECU 50 determines the target damping coefficient Ct from the above relationship based on the index, and controls the damping coefficient C so that the damping coefficient becomes the target damping coefficient.

Therefore, by determining the target damping coefficient Ct from the above relationship based on the index and controlling the damping coefficient C so that the damping coefficient becomes the target damping coefficient, the vertical resonant frequency of the unsprung can be matched with the anti-resonant frequency of the drive shaft 30, which makes it possible to significantly reduce the longitudinal force acting on the wheel 12.

Further, according to the embodiment, the relationship between the target damping coefficient Ct of the shock absorber 18 and the index (gear ratio Rt or gear stage St) is set based on the relationship between the equivalent moment of inertia $I_P$ and the target damping coefficient of the shock absorber that is necessary to match the vertical resonance frequency of the unsprung with the anti-resonance frequency of the drive shaft.

Therefore, the relationship between the target damping coefficient Ct of the shock absorber 18 and the index (gear ratio Rt or gear stage St) can be set to the relationship necessary to make the vertical resonance frequency of the unsprung match with the anti-resonance frequency of the drive shaft.

Further, according to the embodiment, the index is the gear ratio Rt of the transmission 30, and the above relationship is the relationship between the target damping coefficient Ct and the gear ratio of the transmission which is set such that the smaller the gear ratio of the transmission, the larger the target damping coefficient.

Therefore, by determining the target damping coefficient Ct from the above relationship based on the gear ratio Rt of the transmission 30 and controlling the damping coefficient C so that the damping coefficient becomes the target damping coefficient, it is possible to significantly reduce the longitudinal force acting on the wheel 12.

Although the present disclosure has been described in detail with reference to the specific embodiment, it will be apparent to those skilled in the art that the present disclosure is not limited to the above-described embodiment, and various other embodiments are possible within the scope of the present disclosure.

Figure 11B:
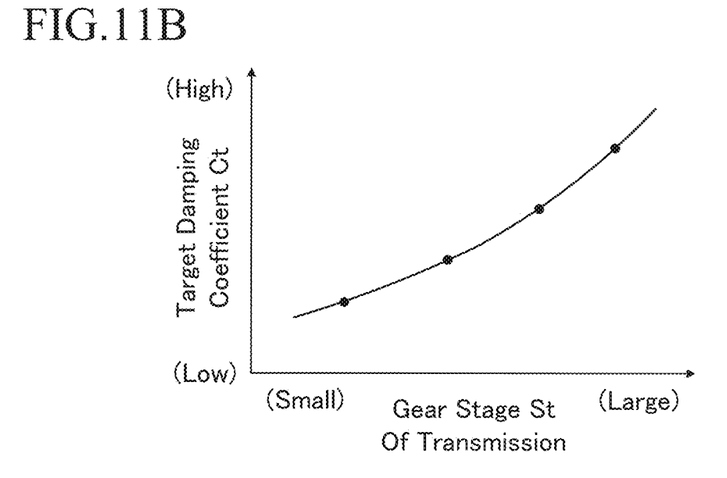
FIG. 11B is a diagram showing an example of a relationship between a gear stage St and a target damping coefficient Ct of the shock absorber.

For example, in the above-described embodiment, the relationship between the index indicating the equivalent moment of inertia $I_P$ of the drive system 14 and the target damping coefficient Ct is the relationship between the gear ratio Rt of the transmission 30 and the target damping coefficient Ct (FIG. 11A). However, in a damping coefficient control device applied to a vehicle in which the transmission 30 is a multi-stage transmission, the relationship between the index and the target damping coefficient Ct may be a relationship between the gear stage St of the transmission 30 and the target damping coefficient Ct (modified example). In that case, the relationship between the gear stage St and the target damping coefficient Ct is set such that the higher the gear stage, the larger the target damping coefficient, as shown in FIG. 13B, for example.

FIG. 11B shows an example of the relationship between the gear stage St of the transmission 30 and the target damping coefficient Ct of the shock absorber 18, based on FIG. 10 and the relationship between the equivalent moment of inertia $I_P$ of the drive system 14 and the gear stage St of the transmission 30. Notably, in FIG. 13B, the black circles are examples of the positions of the gear stages. In addition, in the modified example, in step S10 in FIG. 12, a signal indicating a gear stage St is read, and in step S20, by referring to a map corresponding to FIG. 13B based on the gear stage St, a target damping coefficient Ct is determined.

Since the gear ratio Rt of the transmission 30 becomes smaller as the gear stage St of the transmission becomes higher, the equivalent moment of inertia $I_P$ of the drive system 14 becomes smaller as the gear stage of the transmission becomes higher. According to the modified example, the higher the gear stage St of the transmission 30, the larger the target damping coefficient Ct. Therefore, even if the equivalent moment of inertia $I_P$ of the drive system 14 changes as the gear stage of the transmission changes, the damping coefficient of the shock absorber 18 can be controlled so that the smaller the equivalent moment of inertia, the larger the damping coefficient C.

Furthermore, in the embodiment described above, the suspension arm 16 is arranged between the wheel carrier 22 and the vehicle body 34 so that the rotational axis 24 draws a locus 36 inclined backward at an angle γ with respect to the vertical direction as the wheel 12 moves up and down when viewed in the lateral direction of the vehicle 20. The shock absorber 18 is arranged between the wheel carrier 22 and the vehicle body 34 in a forwardly inclined state. However, the suspension arm 16 may be arranged so that the rotational axis 24 draws a locus that is not inclined backward and the shock absorber 18 may be arranged without inclining forward. It should be noted that the suspension arm 16 and the shock absorber 18 are preferably arranged so as to satisfy at least one of a backward inclination of the locus and a forward inclination of the shock absorber.

What is claimed is:

1. A damping coefficient control device for a shock absorber applied to a vehicle equipped with a wheel that is rotatably supported about a rotational axis by a wheel carrier and has a tire, a drive system that rotationally drives the wheel by a drive source via a transmission and a drive shaft, and a suspension arm that is arranged between the wheel carrier and a vehicle body, wherein
    the damping coefficient control device includes a variable damping coefficient shock absorber arranged between the wheel carrier and the vehicle body and an electronic control unit that controls the shock absorber, and the electronic control unit is configured to acquire information on an index indicating an equivalent moment of inertia of the drive system, and control a damping coefficient of the shock absorber such that the smaller the equivalent moment of inertia indicated by the index, the larger the damping coefficient of the shock absorber.

2. The damping coefficient control device according to claim 1, wherein the wheel carrier and the wheel constitute an unsprung, and the electronic control unit stores a relationship between a target damping coefficient of the shock absorber and an index which is necessary for matching a vertical resonance frequency of the unsprung with an anti-resonance frequency of the drive shaft, and is configured to determine a target damping coefficient from the relationship based on the index, and control the damping coefficient so that the damping coefficient becomes the target damping coefficient.

3. The damping coefficient control device according to claim 2, wherein the relationship between the target damping coefficient of the shock absorber and the index is set based on the relationship between the target damping coefficient of the shock absorber and the equivalent moment of inertia which is necessary to match the vertical resonance frequency of the unsprung with an anti-resonance frequency of the drive shaft.

4. The damping coefficient control device according to claim 3, wherein the index is a gear ratio of the transmission, and the relationship is a relationship between the target damping coefficient and the gear ratio of the transmission which is set such that the smaller the gear ratio of the transmission, the larger the target damping coefficient.

5. The damping coefficient control device according to claim 3, wherein the transmission is a multi-stage transmission, the index is a gear stage of the transmission, and the relationship is a relationship between a target damping coefficient and a gear stage of the transmission which is set such that the higher the gear stage of the transmission, the larger the target damping coefficient.

* * * * *

UNITED STATES PATENT AND TRADEMARK OFFICE
CERTIFICATE OF CORRECTION

PATENT NO. : 12,344,064 B2
APPLICATION NO. : 18/664858
DATED : July 1, 2025
INVENTOR(S) : Shingo Koumura It is certified that error appears in the above-identified patent and that said Letters Patent is hereby corrected as shown below:

In the Specification

Column 9; please replace Table 1 with the below table:

Table 1

| $I_p$ (kgm²) | $\omega_D/2\pi$ (Hz) |
|---|---|
| 1.13 | 15.7 |
| 1.60 | 13.9 |
| 2.26 | 12.5 |
| 3.20 | 11.4 |

$I_T = 3\,\text{kgm}^2$
$K_p = 8000\,\text{Nm/rad}$

Signed and Sealed this
Second Day of September, 2025

Coke Morgan Stewart
*Acting Director of the United States Patent and Trademark Office*